Oct. 2, 1934.  R. A. CLARK  1,975,252
INDUSTRIAL TRUCK
Filed May 26, 1930   10 Sheets-Sheet 1

INVENTOR
Richard A. Clark
BY Geo. B. Pitts
ATTORNEY

Oct. 2, 1934.                R. A. CLARK                1,975,252
                           INDUSTRIAL TRUCK
                    Filed May 26, 1930            10 Sheets-Sheet 2

INVENTOR.
Richard A. Clark
BY Geo. B. Pitts
                                               ATTORNEY.

Oct. 2, 1934.  R. A. CLARK  1,975,252
INDUSTRIAL TRUCK
Filed May 26, 1930  10 Sheets-Sheet 5

INVENTOR
Richard A. Clark
BY Geo. B. Pitts
ATTORNEY

Oct. 2, 1934.  R. A. CLARK  1,975,252
INDUSTRIAL TRUCK
Filed May 26, 1930  10 Sheets-Sheet 6

INVENTOR
Richard A. Clark
BY Geo. B Pitts
ATTORNEY

Oct. 2, 1934.   R. A. CLARK   1,975,252
INDUSTRIAL TRUCK
Filed May 26, 1930   10 Sheets-Sheet 7

INVENTOR.
Richard A. Clark
BY Geo. B. Pitts
ATTORNEY.

Oct. 2, 1934.  R. A. CLARK  1,975,252
INDUSTRIAL TRUCK
Filed May 26, 1930   10 Sheets-Sheet 8

INVENTOR
Richard A. Clark
BY
G. B. Pitts
ATTORNEY

Patented Oct. 2, 1934

1,975,252

UNITED STATES PATENT OFFICE 1,975,252

INDUSTRIAL TRUCK

Richard A. Clark, San Francisco, Calif., assignor to The Baker-Raulang Company, Cleveland, Ohio, a corporation of Ohio Application May 26, 1930, Serial No. 455,572

7 Claims. (Cl. 187—11)

This invention relates to an industrial truck for handling or transporting loads of various kinds, including sheet metal in stacked relation or in packs.

One object of the invention is to provide a truck of this character capable of raising and lowering loads and discharging the same in a ready manner.

Another object of the invention is to provide an elevating mechanism so constructed that upon the application of power to lift the load, such mechanism serves to automatically tilt the load carrier inwardly, whereby the load may be transported with less strain on the truck frame and danger of tipping the load or any portion thereof is reduced to a minimum.

A further object of the invention is to construct a truck having an improved elevating mechanism arranged to tilt the carrier upon the raising of the load and means for moving the carrier back to its normal position at any desired elevation intermediate the travel of the elevating member.

Other objects of the invention will be apparent to those skilled in the art to which my invention relates from the following description taken in connection with the accompanying drawings, wherein.

In the drawings, 1 indicates a suitable frame mounted on wheels 2, 3; by preference all of the wheels being steerable by means of a lever 4 and the former being driven by a motor 5. 6 indicates a pair of uprights secured to the frame 1 and supporting a casing 6a which encloses a drive mechanism for one or more drums 7 on which winds and unwinds flexible hoisting elements—such as wire cables—8, whereby a load handling device 9 (shown herein as an elevating or lifting and carrying member) is raised and lowered. Where two cables 8 are employed, I may provide two drums 7, preferably disposed at opposite sides of their driving mechanism. 10 indicates a platform for an operative or driver mounted on brackets secured to the lower ends of the uprights 6. 11 indicates a foot pedal associated with the platform 10 and connected through suitable linkage 11a with a brake mechanism 12 which operates to engage or release a wheel driven by the motor 5, the brake mechanism being normally biased into braking position as is customary in trucks of this character.

Suitable electric storage batteries 13 are mounted on the frame 1, preferably adjacent the driving end of the truck, the weight of the batteries serving to counterbalance the load on the device 9. The batteries may be enclosed by a casing 13a and supply current to the motor 5 and a motor 14 which operates through the driving mechanism, within the casing 6a, to drive the drums 7. 15 indicates a suitable controller for the motor 5, the controller being operated by a lever 16. 17 indicates a controller for the motor 14, operated by a handle 18.

19 indicates a guide frame preferably rigidly connected at its lower end to the frame 1 and serving to guide the device 9 when raised and lowered by the hoisting elements 8. The guide frame preferably comprises a pair of channels, connected at their upper ends by a tie member 20. Where the guide channels are fixed to the frame 1, their upper ends are braced by suitable members—such as channels—21, connected at their lower ends to the uprights 6. At their upper ends, each brace member 21 is connected to the inner end of a bracket 22, the outer end or portion of which is connected to the adjacent guide channel 19. 23 indicates a cross member having inturned ends connected to the brackets 22 and serving to brace them at their inner ends. Each inturned end of the cross member is disposed between the adjacent brace member 21 and bracket 22 so that the same means (such as rivets) may be employed for securing all of the parts together. A further purpose of the cross-member 23 will later appear. 23a indicates a pair of sheaves movably mounted at the upper end of the guide frame and arranged to guide the cables 8 from the drums 7 for connection with the elevating member 9, so that the latter may be raised and lowered on the guide frame. The mounting for the sheaves 23a will be later described.

The load lifting member 9 comprises a main portion 9a having pairs of rollers 24 which engage the front and rear sides of the guide channels 19 and a carrier or load carrying portion 9b movably mounted on the main portion to effect a tilting of the load. The hoisting elements 8 are directly connected to the load carrying member 9b and indirectly connected to the main portion through a mechanism, indicated as an entirety at 14, which serves to automatically tilt the load carrying member inwardly when pull is applied to the hoisting elements and permits outward movement of such member when the main portion, in its downward movement, is stopped or arrested.

Figure 4:
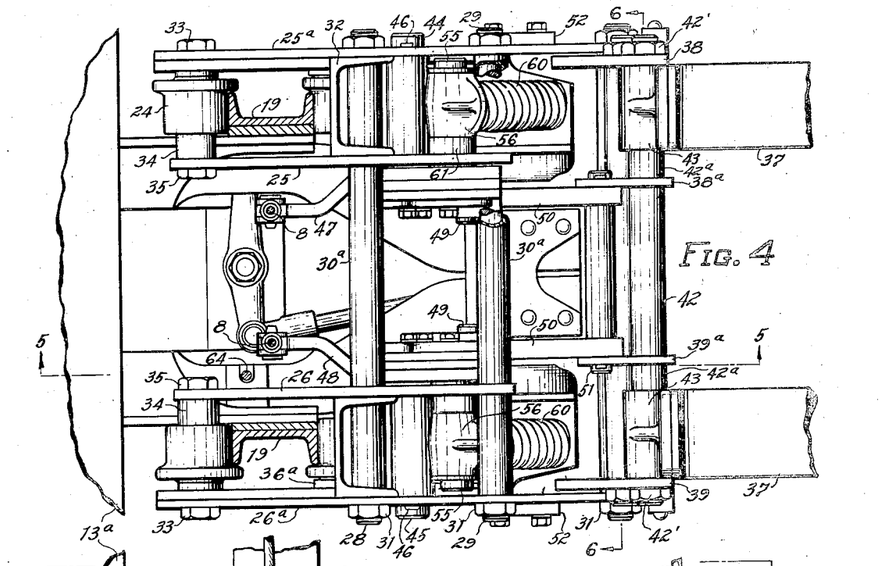
Fig. 4 is a fragmentary section on the line 4—4 of Fig. 1.
Figure 5:
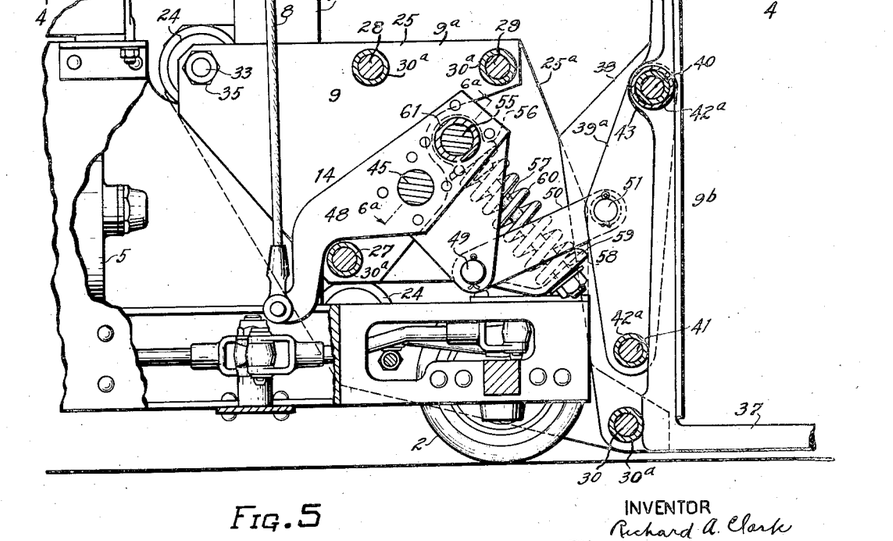
Fig. 5 is a section on the line 5—5 of Fig. 4.
Figure 6:
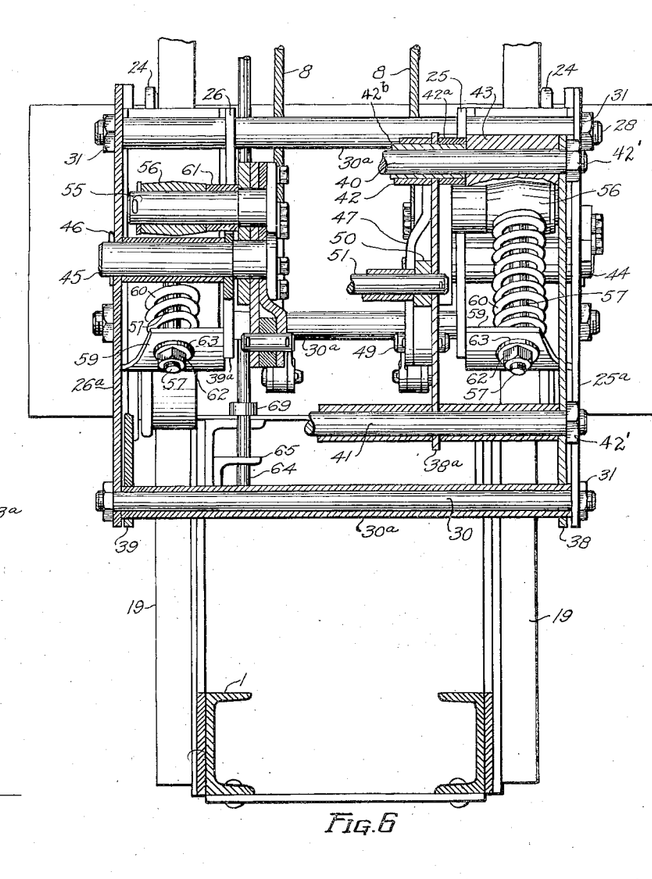
Fig. 6 is a fragmentary section, partly on the line 6—6 of Fig. 4 and partly on the line 6a—6a of Fig. 5.
Figures 7, 8:
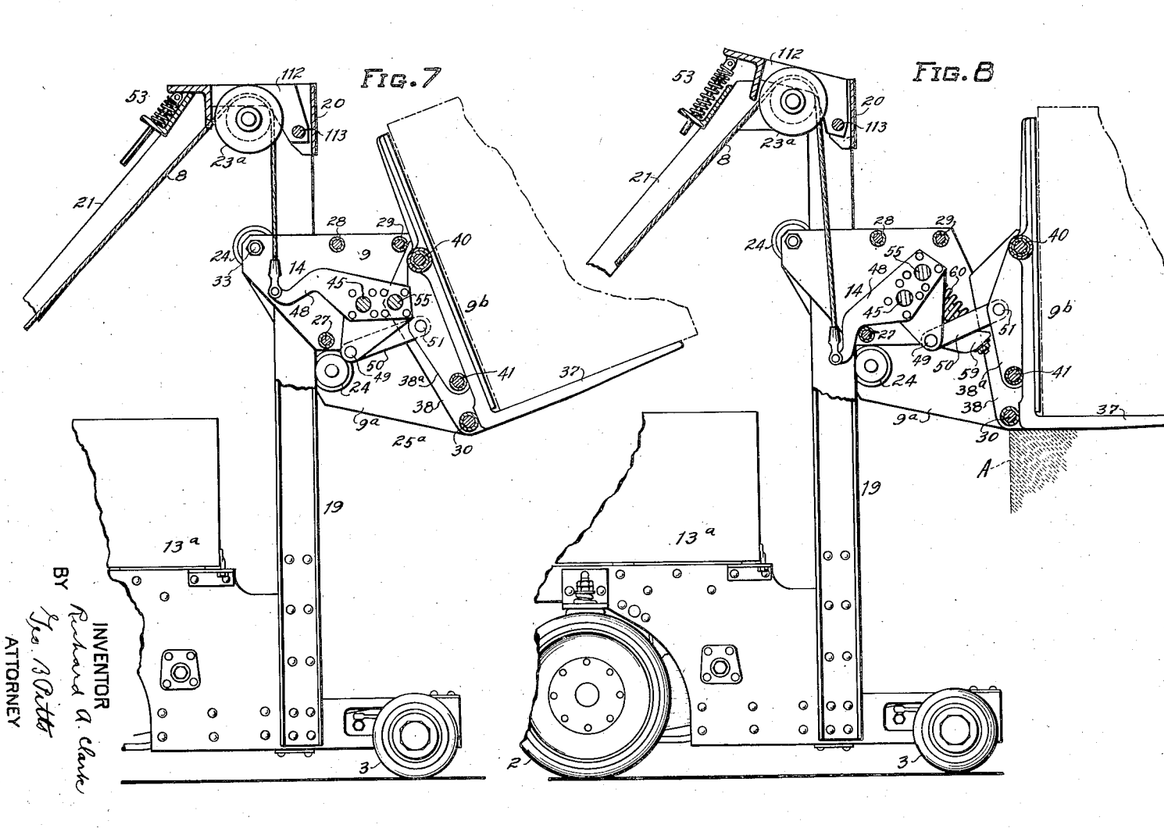
Fig. 7 is a fragmentary section substantially on the line 7—7 of Fig. 3 showing the elevating member elevated and the carrier tilted.
Fig. 8 is a view similar to Fig. 7, but showing the discharge of the load.

The main portion 9a of the lifting member 9 comprises pairs of spaced plates 25—25a, 26—26a, each pair being disposed upon opposite sides of one of the guides 19, as shown in Fig. 4. These plates 25—25a, 26—26a, are connected in spaced relation by a plurality of rods 27, 28, 29 and 30 which extend through aligned openings therein, and have interposed between them sleeves 30a, to space the plates, the plates being clamped against the sleeve ends by nuts 31 threaded on the outer ends of the rods. The plates of each pair are also connected in spaced relation by a channel 32 (the flanges of which are preferably riveted to the plates) and a bolt 33 extending through aligned openings formed in the plates and surrounded by a sleeve 34, the plates being clamped against the ends of the sleeve by a nut 35 threaded on the free end of the bolt. The sleeve 34 preferably serves as the shaft for the adjacent upper roller 24. Each lower roller 24 is mounted on a stud shaft 36 supported by a base 36a fixed to the outer plate 25a or 26a and extending inwardly therefrom. The load carrying portion 9b comprises a pair of L-shaped members 37, and pairs of side plates 38—38a, 39—39a, connected by cross rods 40, 41 and supporting the members 37. Sleeves 42, 42a, surrounding the rods 40 and 41, are interposed between the plates 38—38a and 39—39a, which are clamped against the sleeve ends by nuts 42'. The plates 38, 39, are pivotally mounted at their lower ends on the sleeve 30a surrounding the rod 30 (see Fig. 5), so that the carrier may swing inwardly to the position shown in Fig. 7. The vertical sections of the L-members are provided with hollow bosses 43 through which the shaft 40 extends to support these members on the carrier, the lower ends of the vertical sections resting against the sleeve 30a on the rod 30.

Where the L-members are mounted as above described, each sleeve 42a is interposed between the boss 43 and the adjacent plate 38a or 39a and I may interpose within the sleeves 42 and 42a a sleeve 42b the ends of which are clamped between the bosses, as will be understood from Fig. 6. When it is found desirable to remove the L-members 37 and substitute load engaging elements of a different construction to handle different kinds of loads, the vertical portions of these members may be provided with hooks, the latter being arranged to engage over the sleeves 42a, 42b, which, in this arrangement will be extended and clamped against the outer plates 38, 39.

Figure 14:
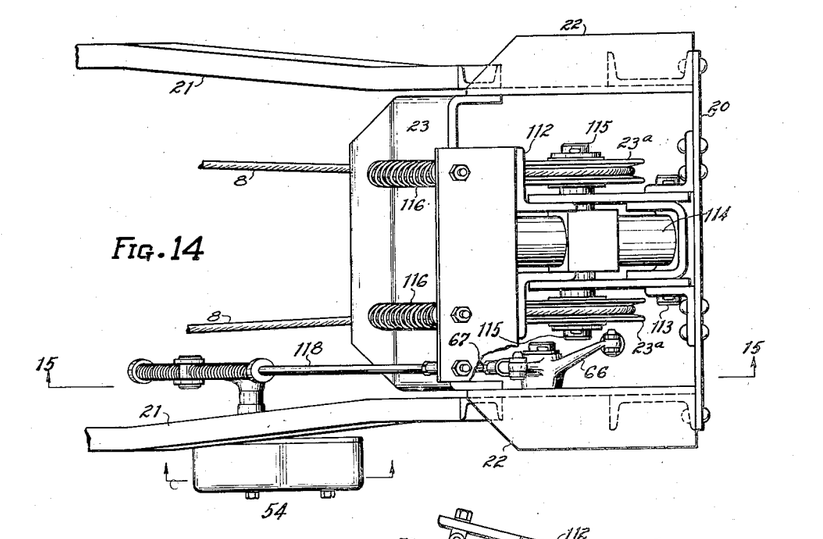
Fig. 14 is a fragmentary plan view of parts shown in Figs. 11 and 13.
Figure 15:
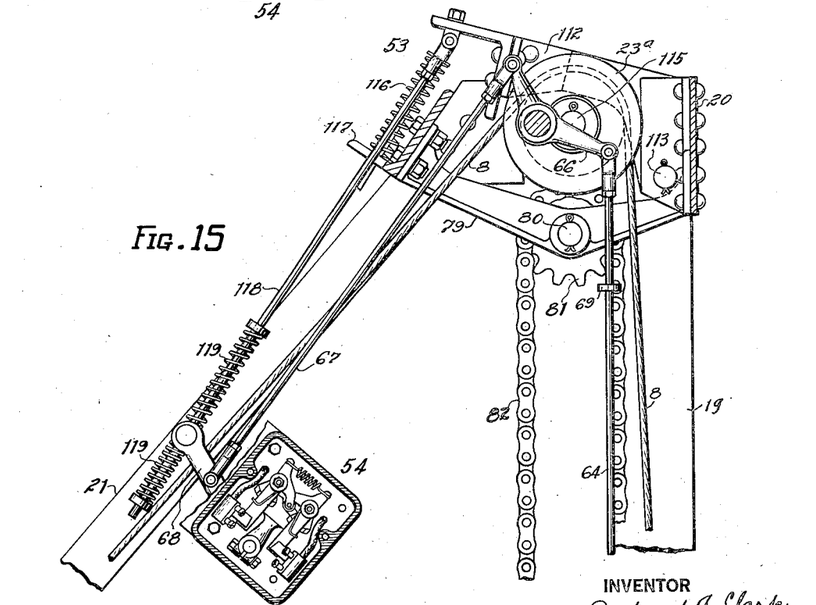
Fig. 15 is a section on the line 15—15 of Fig. 14.
Figure 16:
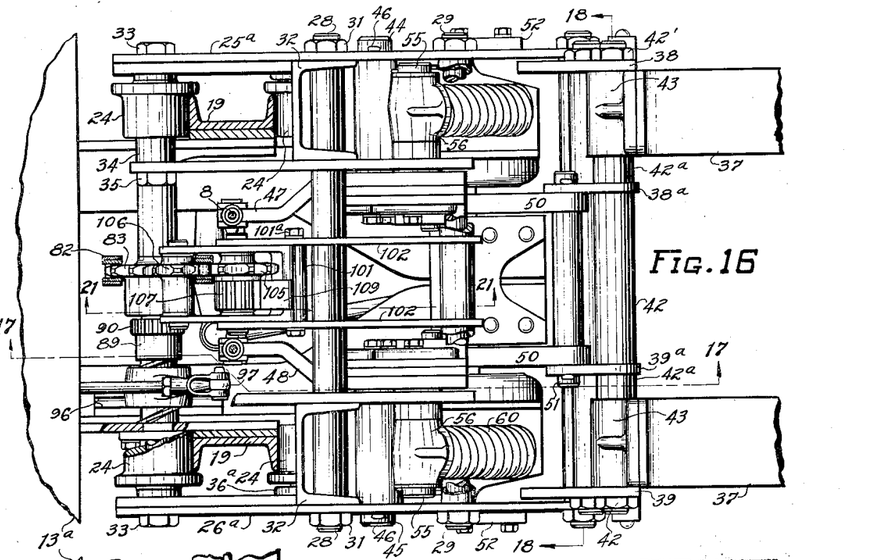
Fig. 16 is a section on the line 16—16 of Fig. 11.
Figure 17:
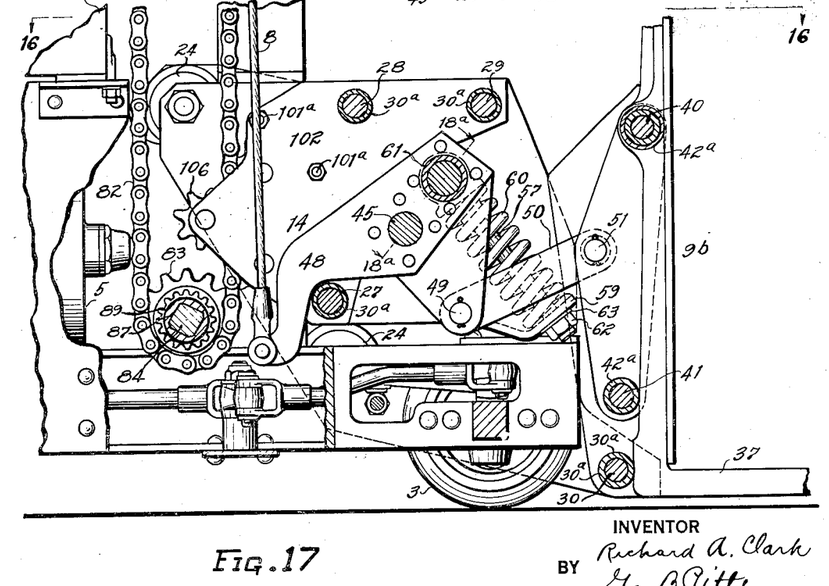
Fig. 17 is a section on the line 17—17 of Fig. 16.
Figure 18:
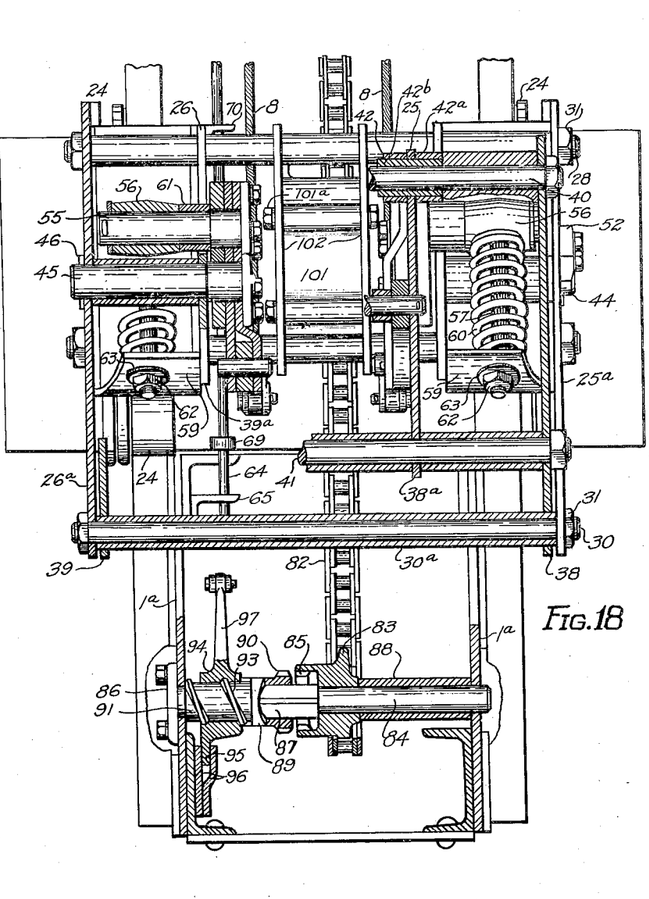
Fig. 18 is a section partly on the line 18—18 of Fig. 16 and partly on the line 18a—18a of Fig. 17.

The operating or tilting mechanism 14 comprises the following: 44, 45, indicate shafts each supported at its opposite ends in the adjacent plates 25—25a or 26—26a, and held against endwise movement inwardly by a cotter pin 46, one being shown in Fig. 6. The inner portion of each shaft is provided with a shoulder to engage the plate 25 or 26 to prevent outward movement of the shaft. 47, 48, indicate levers fulcrumed on the shafts 44, 45, respectively. The inner ends of the levers are pivotally connected, by means of clevises, to the outer ends of the cables 8. The opposite ends of the levers 47, 48, are pivotally connected at 49 to the inner ends of links 50, the outer ends of which are pivotally connected at 51 to the plates 38a, 39a. It will thus be seen that when upward pull on the cables 8 takes place, it will first swing the levers 47, 48, about their shafts 44, 45, and through the links 50, swing the carrier inwardly into engagement with adjustable stops 52 provided on the elevating member 9a, and if the pull is continued, the carrier will remain in this position and the elevating member 9 raised to the desired height. Due to the tension on the cables the elevating member may be lowered, while maintaining the carrier in the tilted position. When the load is to be discharged, the elevating member 9 is lowered into engagement with the floor or an elevated support A (see Fig. 8), which engagement arrests such lowering and releases the tension on the cables 8, the effect of which is to permit the carrier to swing outwardly to its normal or upright position, such outward movement being limited by the engagement of the levers 47, 48, with the cross rod 27 (see Fig. 5). Thereupon the truck may be backed away or withdrawn from such discharge position. Should the operative or driver fail to stop the motor 14 after the elevating member engages the floor or other support and the carrier has swung outwardly, the resulting slack in the cables 8 will permit a slack take-up means, indicated as an entirety at 53 (see Figs. 14 and 15), to operate and these means in turn will operate a switch mechanism 54 (see Fig. 15) to stop the motor 14. The switch mechanism 54 is preferably similar to the mechanism disclosed and claimed in Letters Patent No. 1,726,717, dated September 3, 1929, and granted to Edward H. Remde. No claim is made to the slack take-up means as that forms the subject-matter of an application filed May 31, 1928, by Edward H.

Remde, of Cleveland, Ohio, Ser. No. 281,704 (see Letters Patent No. 1,773,860, dated August 26, 1930).

52a indicates abutments fixed to the carrier 9b and arranged to engage the stops 52.

I provide means which normally tend to swing the carrier outwardly to its normal position, supplementing the action of gravity. The outwardly swinging means are interposed between the main portion 9a of elevating member 9 and the levers 47, 48, and serve to maintain the carrier 9b in normal position when the elevating member is raised and lowered without a load on the carrier, but when the carrier is projected below a load and the cables are operated to lift it, these means yield due to the weight of the load, so that the cables first tilt the carrier and load until the carrier engages the stops 52 and then raise the elevating member, as already described. Of these means, 55, 55, indicate shafts suitably mounted on the levers 47, 48, and extending outwardly therefrom. 56, 56, indicate collars or hubs loosely fitting these shafts and provided with rods 57, 57, which extend downwardly and outwardly, their lower ends projecting through and guided by the walls of openings 58 formed in the lower bent up ends 59 (forming abutments) of the channels 32. 60 indicates springs of the coiled type surrounding the rods and interposed between the abutments 59 and the collars or hubs 56 and normally acting on the latter to swing the levers counter-clockwise (as viewed in Fig. 5). As shown, the levers 47, 48, have portions extending beyond the shafts 44, 45, which portions support the shafts 55, 55, so that the tension of the springs will operate the levers in that direction necessary to tilt the carrier 9b outwardly. 61 indicates a spacing sleeve between each lever and the adjacent collar 56. The free ends of the rods 57 may be threaded to take nuts 62 to secure on the rods washers 63 which may engage the outer faces of the abutments 59 to limit the movement of the rods under the influence of the springs.

64 indicates a rod extending longitudinally of the guides 19 and guided at its lower end by the walls of an opening formed in a bracket 65 carried by a portion of the frame 1. The upper end of the rod is pivotally connected to one arm of a lever 66 fulcrumed on the adjacent plate 22. The other arm of the lever is connected to a link 67 which in turn is connected to the operating element 68 of the switch mechanism 54. The rod 64 is provided with adjustable tappets 69 which are engaged by a lug or projecting member 70 carried by the elevating member 9, the lug engaging one tappet when the member 9 reaches its limit of movement in either direction and operating through it and the rod 64 to operate the switch mechanism and thus break the circuit to the motor 14.

Figures 9, 10:
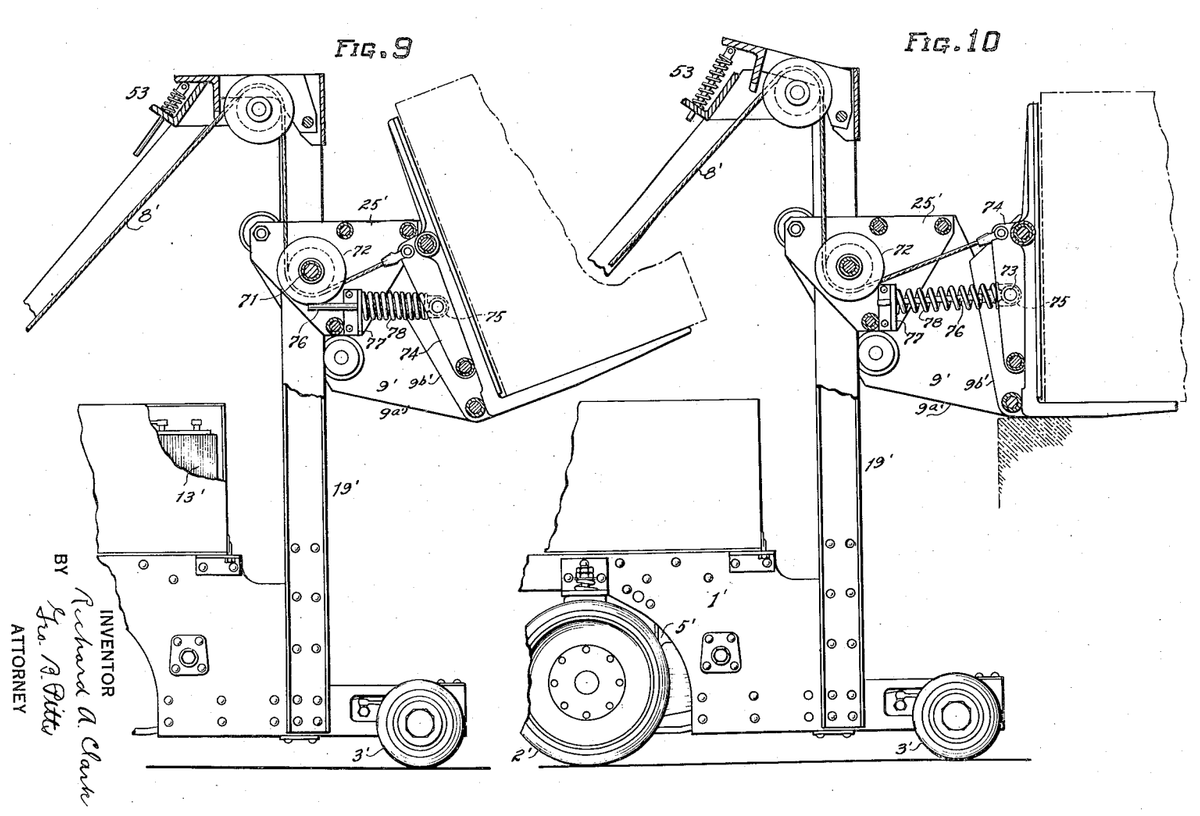
Fig. 9 is a view similar to Fig. 7, but illustrating a slightly different form of construction.
Fig. 10 is a view similar to Fig. 9, but showing the discharge of the load.
Figures 11, 12, 21, 22:
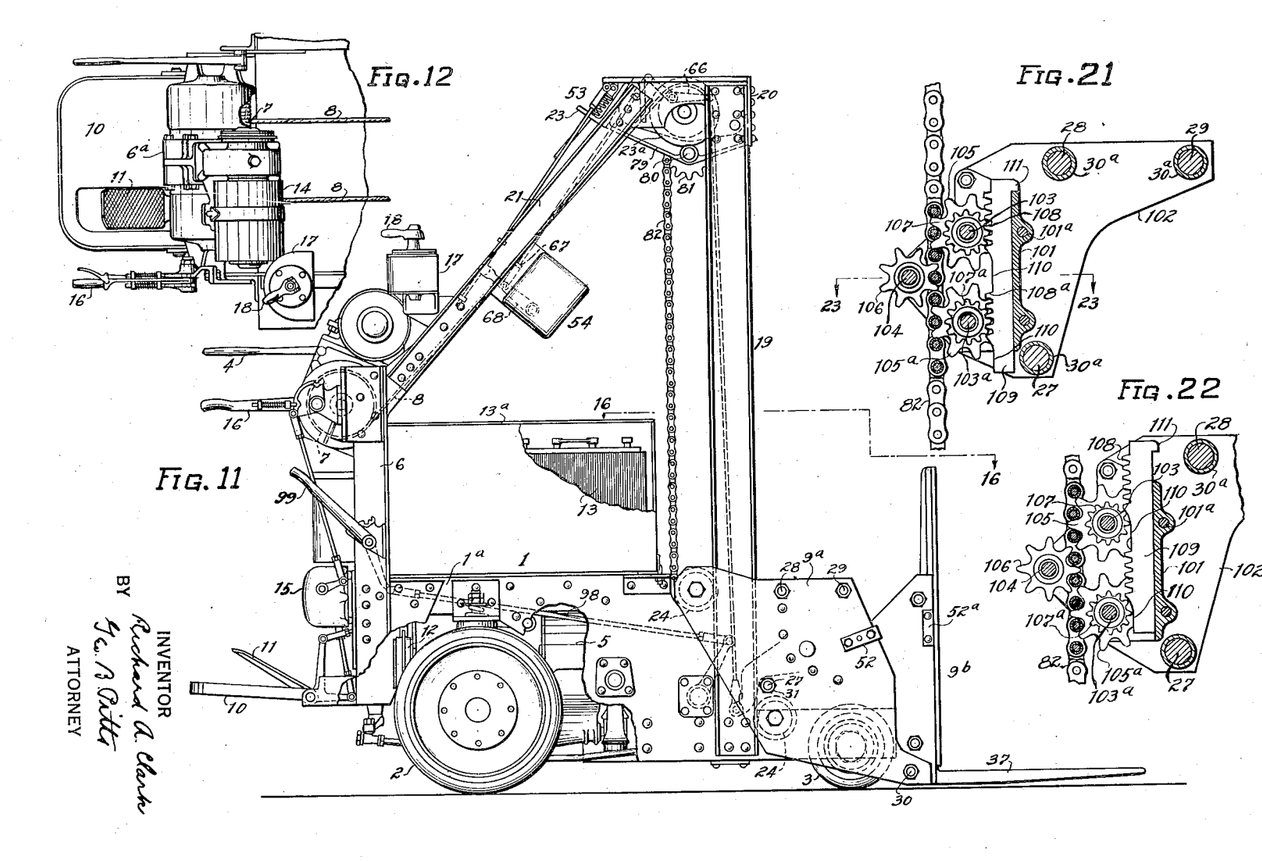
Fig. 11 is a side view of a truck similar to Fig. 1, but having means for effecting the discharge of the load at any desired elevation.
Fig. 12 is a fragmentary plan view of parts shown in Fig. 11.
Fig. 21 is a fragmentary section on the line 21—21 of Fig. 16.
Fig. 22 is a view similar to Fig. 21, but showing the parts in a different position.
Figure 13:
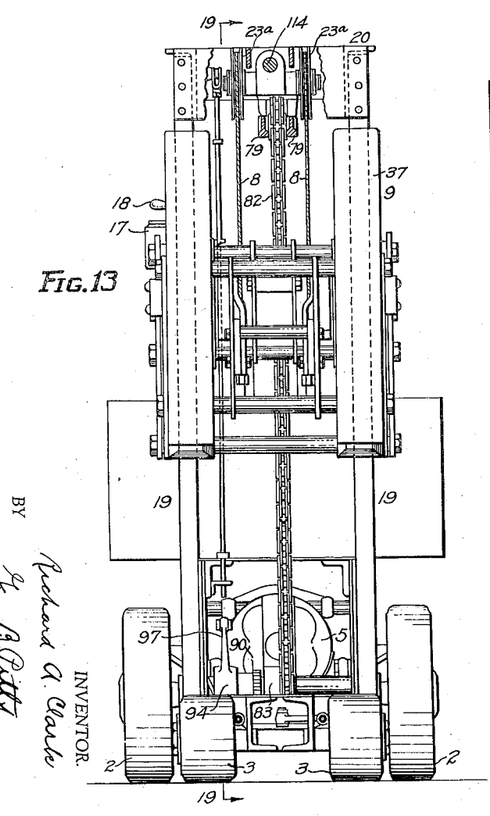
Fig. 13 is a front view of the truck shown in Fig. 11.

Figs. 9 and 10 show a different embodiment of my invention. Referring to these views, 1' indicates the frame mounted on steerable wheels 2', 3'. 13' indicates the batteries for supplying current to the traction motor 5' and the motor (not shown) for operating the cables 8'. 19' indicates the guides for the elevating member 9' comprising the main portion 9a' and the carrier 9b'. 71 indicates a shaft supported at its opposite ends by the inner plates 25' (only one plate being shown) of the main portion 9a'. 72 indicates sheaves, one for each cable, mounted on the shaft 71. The cables 8' run around the sheaves 72 and are connected at their outer ends to the carrier 9b' and serve to tilt the latter inwardly when pull on the cables takes place, as shown in Fig. 9. The means which normally tend to swing the carrier outwardly and thus prevent tilting thereof during raising and lowering of the elevating member 9' without a load on the carrier comprise the following: 73 indicates a shaft mounted at its opposite ends in the inner plates 74 of the carrier. 75 indicates a collar or hub loosely mounted on the shaft 73 and provided with a rod 76 which extends rearwardly and projects through and slidably fits an opening formed in a bracket 77, which is secured to the inner plate 25' of the main portion 9a'. 78 indicates a coiled spring surrounding the rod 77 and bearing against the bracket 77 at one end and the collar or hub 75 at its other end. The spring is compressed when the carrier is tilted, as shown in Fig. 9, and serves to maintain the carrier in normal position, except when a load is engaged by the carrier, when pull on the cables will overcome the influence of the spring and tilt the carrier and load due to the power required to lift them.

In Figs. 11 to 23, inclusive, is shown an embodiment of my invention in which means are provided for swinging the carrier outwardly to normal position at any desired elevation without requiring the elevating member to be lowered into engagement with the floor or a support.

Figures 19, 20, 23:
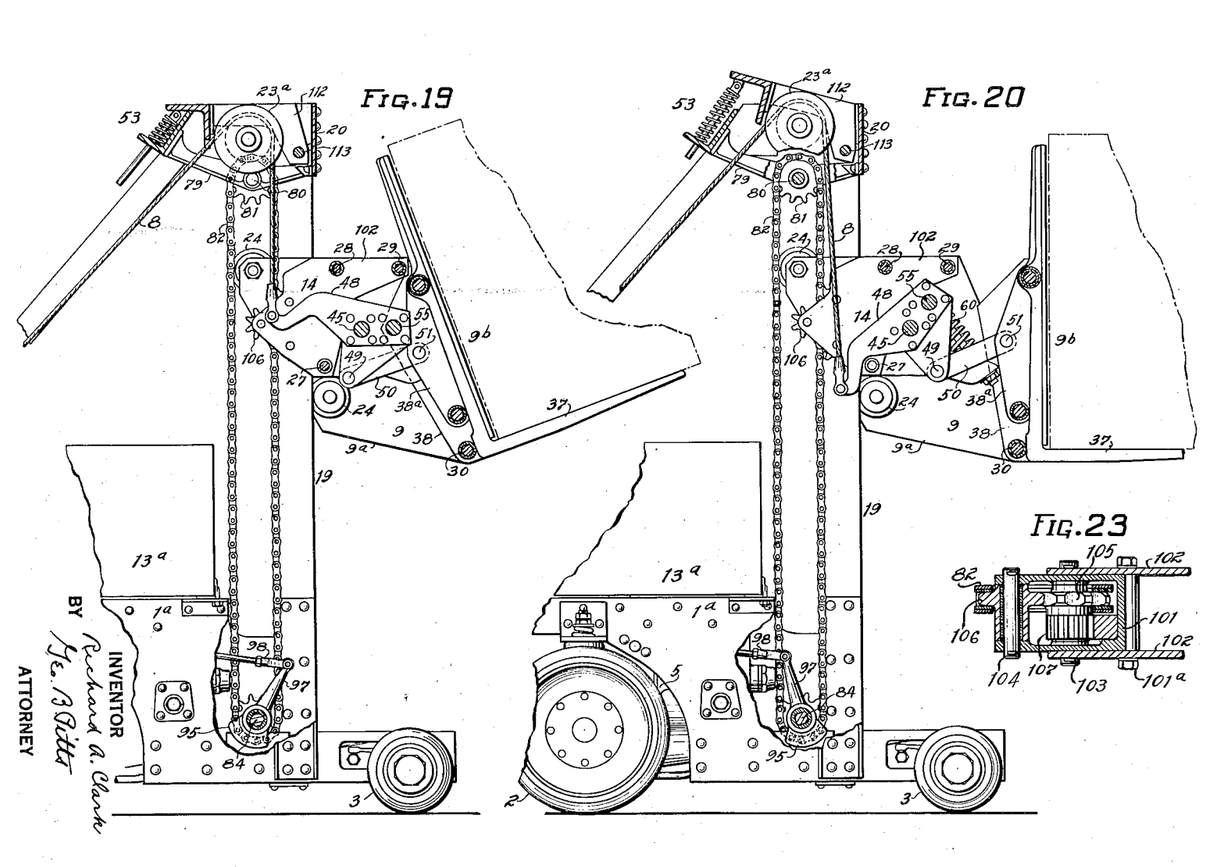
Fig. 19 is a section substantially on the line 19—19 of Fig. 13, showing the elevating member elevated and the carrier tilted.
Fig. 20 is a view similar to Fig. 19, but showing the discharge of the load.
Fig. 23 is a section on the line 23—23 of Fig. 21.

The construction is similar to corresponding parts shown in Figs. 1 to 7, inclusive, and will be referred to by the same reference characters. 79, 79, indicate a pair of hangers secured at their opposite ends to the cross members 20 and 23 and support the opposite ends of a shaft 80. 81 indicates a sprocket loosely mounted on the shaft 80. 82 indicates an endless sprocket chain running around the sprocket 81 and a sprocket 83 rotatably mounted on a shaft 84 supported at its ends in the side plates 1a of the frame 1 near or adjacent the lower end of the guides 19. The chain 82 is free to run about the sprockets 81 and 83 but is so connected to the elevating member 9, that in the downward movement of the latter, in the event the chain is locked against movement, it will arrest such downward movement and thus relieve the tension of the cables 8, the effect of which will be to permit the carrier 9b to swing outwardly to its normal position, as shown in Fig. 20. The hub of the sprocket 83 is provided with clutch elements 85 for a purpose later to be set forth. The shaft 84 is formed integrally at one end with a flange 86, which is bolted rigidly to the adjacent side plate 1a. One end portion of the shaft is squared as shown at 87, the inner end walls of the squared portion co-operating with a sleeve 88 surrounding the other end portion of the shaft and engaging the other side plate 1a to hold the sprocket 83 in alignment with the sprocket 81.

89 indicates a clutch member slidably fitting the squared portion 87 of the shaft 84. The inner end of the clutch member is provided with clutch elements 90 adapted to engage and disengage the clutch elements 85. The outer portion of the clutch member is reduced, as shown at 91, to form a shoulder 92 and the reduced portion 91 is provided with a screw thread 93 of relatively long pitch. 94 indicates a nut threaded on the screw threads 93. The nut 94 is provided at one side with a flange 95 which revolves between spaced walls 96 secured to the adjacent portion of the frame 1 (see Fig. 18). The nut 94 is also provided with an arm 97 to which is pivoted one end of a link 98. The opposite end of the link 98 is pivotally connected to a hand operated lever 99, suitably fulcrumed on a bracket 100, which is carried by the adjacent upright 6. By swinging the lever 99 clockwise (as viewed in Fig. 11), the nut 94 will be rotated in the opposite direction, and as the nut is held against movement laterally by the walls 96, the clutch member 89 will be moved endwise and effect engagement of the clutch elements 90 with the clutch elements 85. As the clutch member 89 is non-rotatable, such engagement will lock the sprocket against turning, and prevent running of the chain 82; rotation of the nut 94 in the opposite direction will effect disengagement of the clutch elements and release the sprocket 83. The clutch member 89 is limited in its outward movement by engagement of the shoulder 92 with the adjacent end of the nut 94.

The connection between the chain 82 and the main portion 9a of the elevating member 9 comprises the following devices: 101 indicates a U-shaped casting secured by bolts 101a between a pair of plates 102, which are rigidly supported between spacing sleeves on the cross rods 27, 28 and 29. 103, 103a, 104, indicate shafts supported at their opposite ends in the side walls of the casting 101 and loosely supporting sprockets 105, 105a, 106, respectively, the sprockets 105, 105a, being disposed on the outer side of the outer run of the chain 82 and the sprocket 106 being disposed on the inner side of the outer run and serving to maintain the chain in engagement with the sprockets 105, 105a. The hubs of the sprockets 105, 105a, are provided on corresponding sides with gears 107, 107a, which mesh with racks 108, 108a, provided on a movable bar 109 and terminating at their lower ends with plain or toothless portions 110. The bar 109 is slidable endwise in guides provided in the casting 101, as shown in Fig. 23, and is provided at its upper end with a shoulder 111, which engages the upper end of the casting (see Fig. 21) to limit its downward movement.

The operation of the chain connecting devices takes place as follows: In the upward movement of the elevating member, the chain 82 is free to run on its sprockets so that it may travel with the elevating member, but in the event the operative or driver has failed to release the clutch member from the sprocket prior to starting the motor 14, the chain 82 will rotate the sprocket 106, 105, 105a, and the sprockets 105, 105a, in turn, through the pinions 107, 107a, and racks 108, 108a, will slide the bar 109 upwardly and move the plane portions 110 of the bar opposite the pinions (see Fig. 22), so that no damage will result, this construction thereby forming an automatic disconnection means. In the downward movement of the elevating member due to paying out of the cables 8, the clutch member 89 is first disengaged from the sprocket 83 whereby the chain 82 is free to travel with the elevating member, so that the latter may travel the full length of the guides 19. During such downward movement, if it is desired to swing the carrier outwardly (provided the latter is loaded—see Fig. 19) at a predetermined elevation, the operative or driver operates the lever 99 and effects a locking of the sprocket 83. The chain in turn through the connecting devices above described will arrest the elevating member 9, thereby relieving the tension on the cables and permit the carrier to swing to the position shown in Fig. 20. In the event the rack bar 109 at the time the lever 99 is operated is in the position shown in Fig. 22, the chain 82 (which is held stationary) will first rotate the sprockets 105, 105a, which, through the pinions and racks, will move the bar 109 downwardly until the lug 111 engages the casting 101, which engagement will effect the connection between the chain and elevating member and thus prevent further downward movement of the latter.

Figures 1, 2, 24:
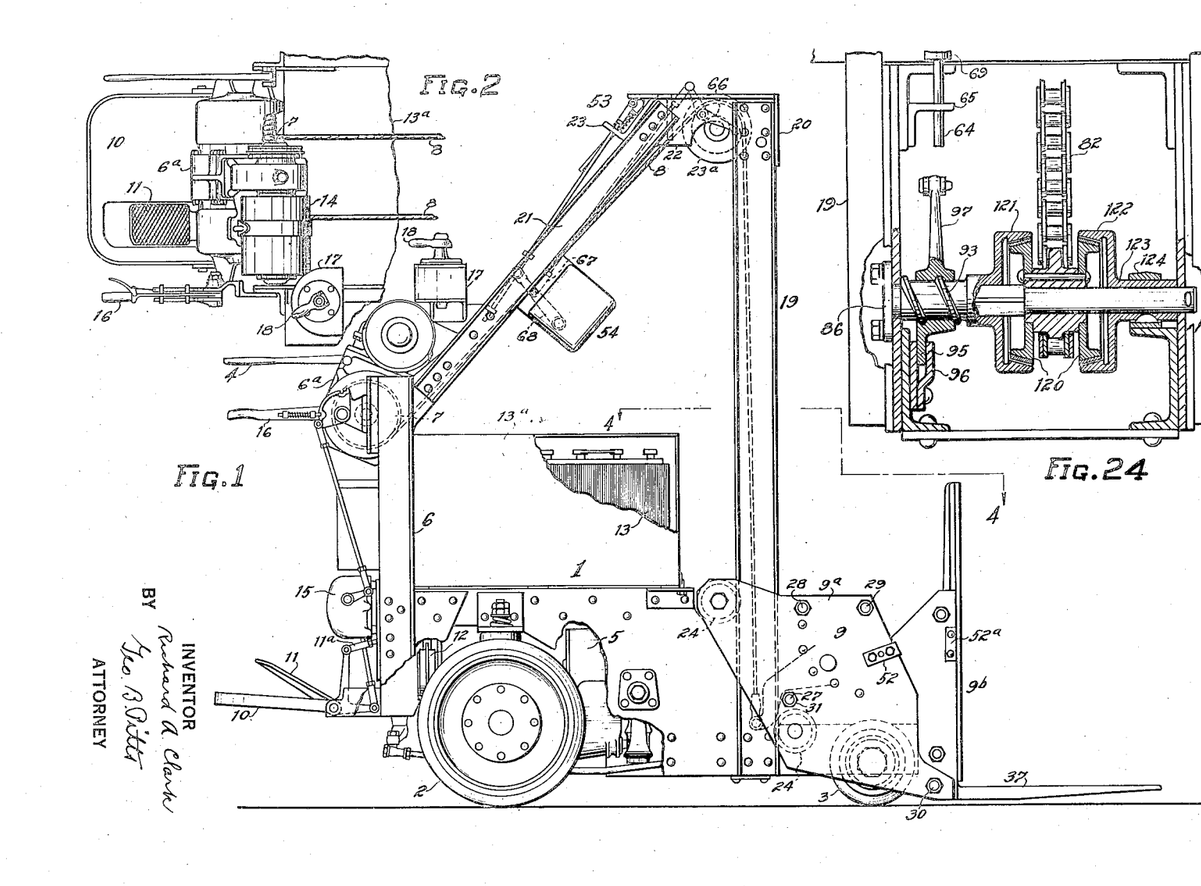
Fig. 1 is a side elevation of a truck embodying my invention.
Fig. 2 is a fragmentary plan view of parts shown in Fig. 1.
Fig. 24 is a fragmentary view of parts shown in Fig. 18, but in which the construction is modified.
Figure 3:
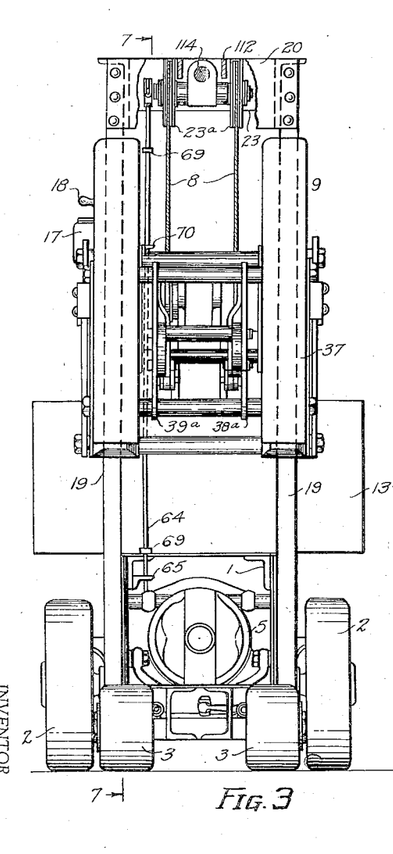
Fig. 3 is a front elevation of the truck.

In Fig. 24 I have shown a slightly different form of clutch, namely, a friction cone clutch, for locking the lower chain sprocket, when the elevating member, in its downward movement, reaches the point or level at which the carrier is to be swung back to normal position. In this form of construction, the sprocket 83 is slidable on the shaft 84 and I provide at opposite sides of the sprocket annular friction clutch elements 120 and provide on the clutch member 89 an annular friction clutch element 121, which engages one element 120 and I also provide a similar element 122 for the other element 120, the element 122 being carried by a sleeve 123 surrounding the shaft 84 and keyed to a collar 124 which is suitably secured to the adjacent channel forming part of the frame 1. By operating the lever 99, the clutch elements 120, 121, 122, are engaged to lock the sprocket 83 and through it the chain 82. A friction type of clutch may be used to advantage in various ways, since the operative or driver may, by proper manipulation of the lever 99, effect a slippage between the clutch elements and maintain the carrier in normal position while moving the elevating member downwardly. In one use of the friction clutch, after it has been thrown in, the elevating member arrested and the carrier moved to its normal position, the operative or driver may determine that the elevating member should be further lowered a slight distance to insure positioning the load at the right elevation. He may then start the motor 14 and move the elevating member downwardly and at the same time manipulate the lever 99 to effect slippage of the clutch so that in such further downward movement the carrier is not tilted inwardly and then moved backwardly to normal position. Such operation will assist the operative or driver in positioning the load at the desired discharge position.

From the foregoing description it will be seen that I provide mechanism for arresting the elevating member and swinging the carrier to its normal position at any desired elevation intermediate the vertical travel of the elevating member and that by providing means for taking up slack in the cables, which slack necessarily results when the elevating member is arrested, and connecting such means with the limit switch mechanism to stop the cable winding and unwinding motor, the latter is stopped following the relieving of the tension on the cables and before undue slack occurs therein without any attention on the part of the operative or driver, so that the responsibility of the operative or driver is not only relieved but his attention may be directed to the backing of the truck upon the discharge of the load without loss of time.

The slack take-up means 53 preferably comprises a cradle 112 pivoted at 113 at its front end on the cross member 20, a rock shaft 114 mounted on the cradle and provided with stud shafts 115 on which rotate the sheaves 23a and one or more coiled springs 116 interposed between a stationary plate 117 and the cradle 112 and normally tending to swing the latter upwardly, so that when slack occurs in the cables 8, the sheaves 23a will be lifted and take up such slack. The cradle 112 is connected by a link 118 to the operating element 68 of the switch mechanism 54, whereby the latter is operated to stop the motor 14 when the cradle 112 swings upwardly. The connection between the link 118 and the element 68 comprises a pair of opposed springs 119 engaging opposite sides of the element 68, which permit the latter to operate when actuated by the link 67 without moving the link 118.

By substituting for the members 37 a scoop or securing a scoop to the members, the truck may be used to scoop up and raise bulk material. In such operation, the elevating member is lowered and the truck is then driven forward projecting the scoop into the material until a load is gathered on the scoop, then the hoist cables are operated which tilts the scoop with the material and then raises it to the desired height for transportation.

To those skilled in the art to which my invention relates, many changes in construction and widely differing embodiments and applications of the invention will suggest themselves without departing from the spirit and scope thereof. My disclosures and the description herein are purely illustrative and are not intended to be in any sense limiting.

What I claim is:

1. In apparatus of the class described, the combination of a wheel mounted frame, a vertical guide mounted on said frame, an elevating member comprising a main portion engaging said guide and movable upwardly and downwardly thereon and a carrier pivoted on said main portion to swing inwardly and tilt the load thereon, a lever fulcrumed on said main portion and connected at one end with said carrier, a flexible member extending downwardly from the upper end of said guide and connected to the other end of said lever, whereby pull exerted on said flexible member will first tilt said carrier and then raise said elevating member, and means for winding up and unwinding said flexible member.

2. In apparatus of the class described, the combination of a wheel mounted frame, a vertical guide mounted on said frame, an elevating member comprising a main portion engaging said guide and movable upwardly and downwardly thereon and a carrier pivoted at its lower inner portion on said main portion to swing inwardly and having portions extending outwardly from said pivot for supporting a load, a lever fulcrumed on said main portion and connected at one end with said carrier, a flexible member extending downwardly from the upper end of said guide and connected to the other end of said lever, whereby pull exerted on said flexible member will first tilt said carrier with the load thereon inwardly and then raise said elevating member while maintaining the carrier in tilted position, and means for winding up and unwinding said flexible member.

3. In apparatus of the class described, the combination of a wheel mounted frame, a vertical guide mounted on said frame, an elevating member comprising a main portion mounted on said guide to move upwardly and downwardly thereon and a carrier swingable on said main portion into an inwardly tiltable position, means connected with said carrier and operatively engaging the main portion of said elevating member for first tilting the carrier and then raising said elevating member, and means for arresting the downward movement of said elevating member in any predetermined position throughout the travel thereof, said arresting means comprising an endless flexible member having a vertical run arranged parallel to the travel of said elevating member and operatively connected thereto, and devices for locking the flexible member against movement.

4. In apparatus of the class described, the combination of a wheel mounted frame, a vertical guide fixed to said frame, an elevating member comprising a main portion mounted on said guide to move upwardly and downwardly thereon and a carrier swingable on said carrier into an inwardly tiltable position, means connected with said carrier and operatively engaging the main portion of said elevating member for first tilting the carrier and then raising said elevating member, and means for arresting the downward movement of said elevating member in any predetermined position throughout the travel thereof, said arresting means comprising an endless flexible member, operative connections between one run of said flexible member and said elevating member and devices for locking the flexible member against movement.

5. In apparatus of the class described, the combination of a wheel mounted frame, a vertical guide mounted on said frame, an elevating member comprising a main portion mounted on said guide to move upwardly and downwardly thereon and a carrier swingable on said carrier into an inwardly tiltable position, means connected with said carrier and operatively engaging the main portion of said elevating member for first tilting the carrier and then raising said elevating member, and means for arresting the downward movement of said elevating member in any predetermined position throughout the travel thereof, said arresting means comprising an endless flexible member, operative connections between one run of said flexible member and a clutch arranged to engage one guide element for said flexible member to lock the latter against movement.

6. In apparatus of the class described, the combination of a wheel mounted frame, a vertical guide mounted on said frame, an elevating member comprising a main portion mounted on said guide to move upwardly and downwardly thereon and a carrier swingable on said main portion into an inwardly tiltable position, means connected with said carrier and operatively engaging the main portion of said elevating member for first tilting the carrier and then raising said elevating member, and means for arresting the downward movement of said elevating member in any predetermined position throughout the travel thereof, said arresting means comprising an endless flexible member, operative connections between one run of said flexible member and said elevating member and devices for locking the flexible member against movement, said operative connections being arranged to automatically release said elevating member in the upward movement of the latter when said flexible member is locked against movement.

7. In apparatus of the class described, the combination of a wheel mounted frame, a vertical guide on said frame, an elevating member comprising a main portion mounted on said guide to move upwardly and downwardly thereon and a carrier swingable on said main portion into a tiltable position, means connected with said carrier and operatively engaging the main portion of said elevating member for first tilting the carrier and then raising said elevating member, an endless flexible member having a vertical run arranged parallel to the travel of said elevating member, rotatable guide elements on said elevating member for said flexible member and arranged to be rotated thereby when said flexible member is held against movement, a stop on said elevating member, a device movable relative to said stop, gearing between one of said guide elements and said device arranged to move the latter into engagement with said stop to arrest said elevating member in its downward movement, and means for locking said flexible member against movement.

RICHARD A. CLARK.